US007177518B2

(12) United States Patent
Chun

(10) Patent No.: US 7,177,518 B2
(45) Date of Patent: Feb. 13, 2007

(54) CLIPS FOR HOLDING FIBER OPTIC CABLES OF A SECURITY FENCE

(75) Inventor: Hong Gi Chun, Seoul (KR)

(73) Assignee: Fomguard Inc., Seoul (KR)

( * ) Notice: Subject to any disclaimer, the term of this patent is extended or adjusted under 35 U.S.C. 154(b) by 0 days.

(21) Appl. No.: 10/842,548

(22) Filed: May 11, 2004

(65) Prior Publication Data

US 2005/0254767 A1 Nov. 17, 2005

(51) Int. Cl.
*G02B 6/00* (2006.01)

(52) U.S. Cl. ........................................ 385/136; 385/83

(58) Field of Classification Search ................ 385/136, 385/83, 137, 65

See application file for complete search history.

(56) References Cited

U.S. PATENT DOCUMENTS

| | | | | | |
|---|---|---|---|---|---|
| 3,557,512 | A | * | 1/1971 | Braeuninger et al. | 52/793.11 |
| 4,275,294 | A | | 6/1981 | Davidson | |
| 4,339,430 | A | * | 7/1982 | Gaffar | 424/54 |
| 4,371,869 | A | | 2/1983 | Davidson | |
| 4,399,430 | A | | 8/1983 | Kitchen | |
| 4,450,434 | A | | 5/1984 | Nielsen et al. | |
| 4,558,308 | A | | 12/1985 | Ciordinik et al. | |
| 4,676,485 | A | | 6/1987 | Ciordinik et al. | |
| 4,680,573 | A | | 7/1987 | Ciordinik et al. | |
| 4,688,024 | A | * | 8/1987 | Gadde | 340/550 |
| 4,850,671 | A | * | 7/1989 | Finzel | 385/69 |
| 4,865,412 | A | * | 9/1989 | Patterson | 385/71 |
| 5,134,386 | A | | 7/1992 | Swanic | |
| 5,159,655 | A | * | 10/1992 | Ziebol et al. | 385/81 |
| 5,416,467 | A | | 5/1995 | Ohata et al. | |
| 5,434,557 | A | | 7/1995 | Alizi | |
| 5,434,944 | A | * | 7/1995 | Kerry et al. | 385/135 |
| 5,441,239 | A | * | 8/1995 | Watson | 256/1 |
| 5,475,781 | A | * | 12/1995 | Chang et al. | 385/76 |
| 5,499,310 | A | * | 3/1996 | Ueda | 385/84 |
| 5,568,584 | A | * | 10/1996 | Smith | 385/135 |
| 5,580,104 | A | * | 12/1996 | Stallard, III | 285/124.3 |
| 5,592,149 | A | | 1/1997 | Alizi | |
| 5,668,911 | A | * | 9/1997 | Debortoli | 385/135 |
| 5,734,777 | A | * | 3/1998 | Merriken et al. | 385/135 |
| 5,835,660 | A | * | 11/1998 | Jung et al. | 385/137 |

(Continued)

FOREIGN PATENT DOCUMENTS

| | | |
|---|---|---|
| KR | 1997-0009968 | 6/1997 |
| KR | 20-0205489 | 12/2000 |
| KR | 20-0205490 | 12/2000 |

*Primary Examiner*—Ellen E. Kim
(74) *Attorney, Agent, or Firm*—Birch, Stewart, Kolasch & Birch, LLP

(57) ABSTRACT

A clip for holding a first section of fiber optic cable to a second section of fiber optic cable is useful in forming a weave pattern in a fiber optic security fence. The fiber optic security fence is constructed by forming a zigzag pattern in a fiber optic cable and attaching this pattern to an existing barrier fence, e.g. a galvanized chain-link fence. Clips are provided to hold portions of the fiber optic cable together in the zigzag pattern. The clips are formed such that, once installed, they are very difficult to remove without cutting, stressing or bending the fiber optic cable sections passing therethrough. Therefore, the clips will prevent intruders from disconnecting the pattern of the fiber optic cable, in order to cut through the barrier fence and gain entry into a secure area.

22 Claims, 9 Drawing Sheets

U.S. PATENT DOCUMENTS

| | | | | |
|---|---|---|---|---|
| 5,999,683 | A * | 12/1999 | Gustafsson | 385/136 |
| 5,999,684 | A * | 12/1999 | Bloom | 385/137 |
| 6,388,824 | B1 * | 5/2002 | Treichler et al. | 359/819 |
| 6,461,052 | B1 * | 10/2002 | Hines et al. | 385/53 |
| 6,508,594 | B1 * | 1/2003 | Bruland | 385/77 |
| 6,625,374 | B2 * | 9/2003 | Holman et al. | 385/135 |
| 6,640,041 | B2 * | 10/2003 | Ichinari et al. | 385/136 |
| 6,707,979 | B2 * | 3/2004 | Wang et al. | 385/140 |
| 6,788,871 | B2 * | 9/2004 | Taylor | 385/135 |
| 6,870,997 | B2 * | 3/2005 | Cooke et al. | 385/135 |
| 6,944,388 | B2 * | 9/2005 | Rodrigues et al. | 385/135 |
| 6,947,654 | B2 * | 9/2005 | Krampotich et al. | 385/134 |
| 2001/0046355 | A1 * | 11/2001 | Schmatz | 385/59 |
| 2003/0113088 | A1 * | 6/2003 | Takeya et al. | 385/136 |

* cited by examiner

CLIPS FOR HOLDING FIBER OPTIC CABLES OF A SECURITY FENCE

BACKGROUND OF THE INVENTION

1. Field of the Invention

The present invention relates to a security fence employing a fiber optic cable formed in a pattern and to attached to the security fence to monitor the integrity of the fence against intrusion or tampering. More particularly, the present invention relates to a clip for holding portions of the fiber optic cable, so as to securely hold the fiber optic cable into the pattern.

2. Description of the Related Art

Security fences employing a fiber optic cable monitoring scheme are generally known in the background. For example, see applicant's prior application Ser. No. 10/713, 425 filed Nov. 17, 2003, entitled "APPARATUS AND METHOD TO DETECT AN INTRUSION POINT ALONG A SECURITY FENCE," which is herein fully incorporated by reference. Also see U.S. Pat. Nos. 4,275,294; 4,371,869; 4,399,430; 4,450,434; 4,558,308; 4,676,485; 4,680,573; 5,134,386; 5,416,467; 5,592,149; and the assignees prior Korean Patents 1997-0009968, 20-0205489, and 20-0205490.

In the systems known in the background art, a length of fiber optic cable is formed into a pattern, such as a zigzagging pattern. The pattern is attached to an existing barrier type fence, such as a galvanized chain-link fence. The pattern in the fiber optic cable has a weave size and/or shape which is smaller than the size of a human, so that a human cannot pass though the weave pattern without disrupting the fiber optic cable. In other words, a person would need to cut the fiber optic cable or severely distort the cable (e.g. by bending, stretching and/or pinching) to form a hole in the pattern large enough to pass through. Any such cutting or distortion of the fiber optic cable will interrupt or interfere with light passing through the fiber optic cable and will cause an alarm to be raised.

FIG. 1 illustrates a galvanized chain-link fence 10, in accordance with the background art. In FIG. 1, a fiber optic cable 12 is formed into a zigzagging pattern and attached to the barrier fence 10. A plurality of clips 14 hold the fiber optic cable in the zigzagging pattern.

FIG. 2 is a close-up view of the zigzagging pattern of the fiber optic cable 12, with the barrier fence 10 removed for clarity. FIG. 3 is a close-up view of the clip 14, in accordance with the background art. The clip 14 will be described in greater detail with reference to FIGS. 4–6.

The clip 14 is primarily composed a first part 16 and second part 17. The first part 16 (FIG. 4) is a unitary or one-piece part including a disc-shaped portion 18 and a stem portion 20. The first part 16 would have a substantially T-shaped cross section taken along its mid-line, as can be envisioned in FIG. 4.

The second part 17 (FIG. 5) is a unitary part and is generally disc shaped. A centrally located hole 22 is provided to accept the stem portion 20 of the first part 16. An upper perimeter of the second part 17 has a raise edge 24. The raised edge 24 includes first, second, third and fourth channels 25, 26, 27, and 28 passing therethrough.

To form the zigzagging pattern, an installer must connect portions of the fiber optic cable together. As illustrated in FIG. 5, a first section 30 of the fiber optic cable 12 is manually passed through the first and second channels 25 and 26. A second portion 32 of the fiber optic cable 12 is manually passed through the third and fourth channels 27 and 28.

Next, as illustrated in FIG. 6, the stem portion 20 of the first part 16 is manually inserted through the centrally located hole 22 of the second part 17. Finally, an end 23 of the stem portion 22 is deformed or flattened. The deformation of the end 23 of the stem portion 20 may be accomplished by a tool, and would be similar to a riveting of the first part 16 onto the second part 17.

SUMMARY OF THE INVENTION

The Applicant has discovered drawbacks in the state of the art clips for holding a fiber optic security fence into a given pattern. For example, the clips can be cumbersome to manually install, since the first and second sections 30 and 32 of fiber optic cable 12 must be held into relatively shallow first through fourth channels 25, 26, 27, and 28 on the second part 17, while riveting the first part 16 onto the second part 17. Also the design of the clip 14 results in exposed open edges between the first and second parts 16 and 17. The exposed open edges can be exploited by a would-be intruder in an attempt to pry the first part 16 off of the second part 17, while gripping the second part 17 with a tool (e.g. locking pliers).

Another potential drawback is the exposure of the flattened end 23 of the stem portion 20. A would-be intruder could attempt to cut off the flattened end 23 of the stem portion 20. If successful, the first part 16 could be removed from the second part 17. If the would-be intruded could gently remove one of more of the clips 14 and gently separate the weave pattern of the fiber optic cable 12, it might be possible to then cut the underlying barrier fence 10 and gain undetected entrance into a secure area.

It is an object of the present invention to address one or more of the applicant's appreciated potential drawbacks of the clip 14 in accordance with the background art.

It is an object of the present invention to provide a clip that is stronger than the clips of the background art and hence more difficult to break or cut.

It is an object of the present invention to provide a clip which is more difficult to remove from a first and second section of a fiber optic cable without bending, breaking or stressing the cable, and hence raising an alarm.

It is an object of the present invention to provide a clip, which is easy to manufacture, inexpensive and easy to install.

These and other objects are accomplished by a clip for holding a first section of fiber optic cable to a second section of fiber optic cable, which is very difficult to remove without cutting, stressing or bending the fiber optic cable portions passing therethrough. Such a clip will prevent intruders from disconnecting the pattern of the fiber optic cable, in order to cut through the barrier fence and gain entry into a secure area.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF A PREFERRED EMBODIMENT

Figure 1:
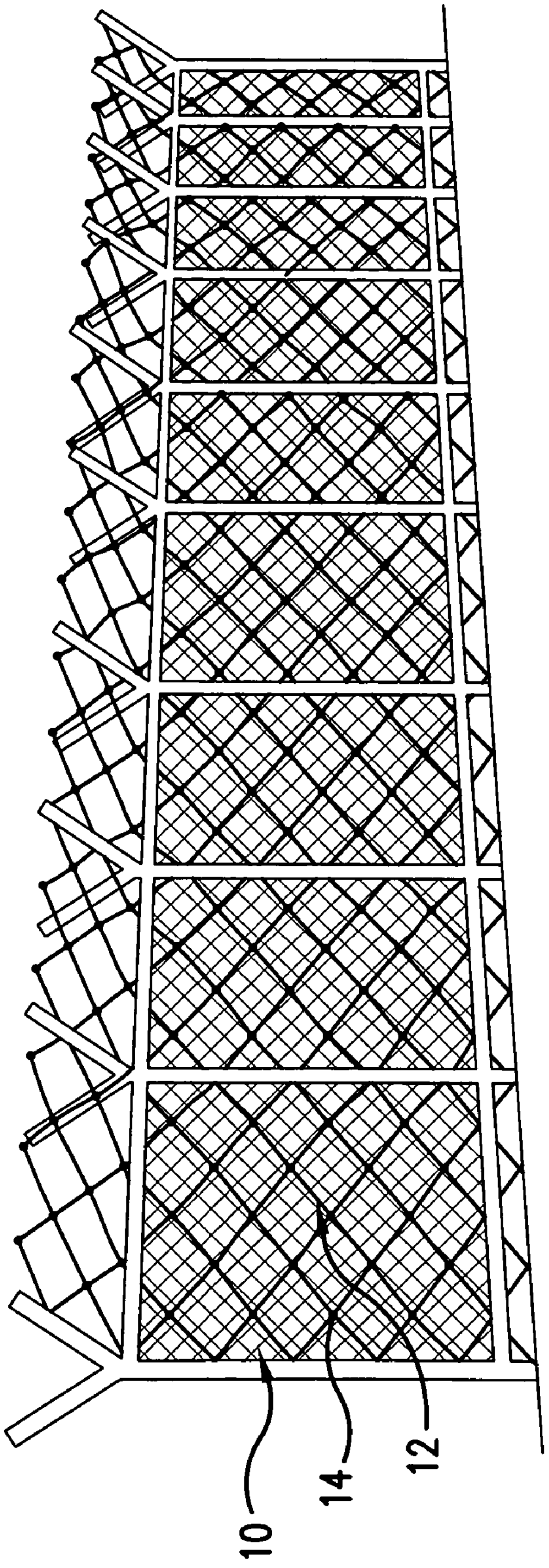
FIG. 1 BACKGROUND ART
FIG. 1 is a perspective view of a section of chain-link barrier fence with a fiber optic cable monitoring the integrity of the barrier fence, in accordance with the background art.
Figure 2:
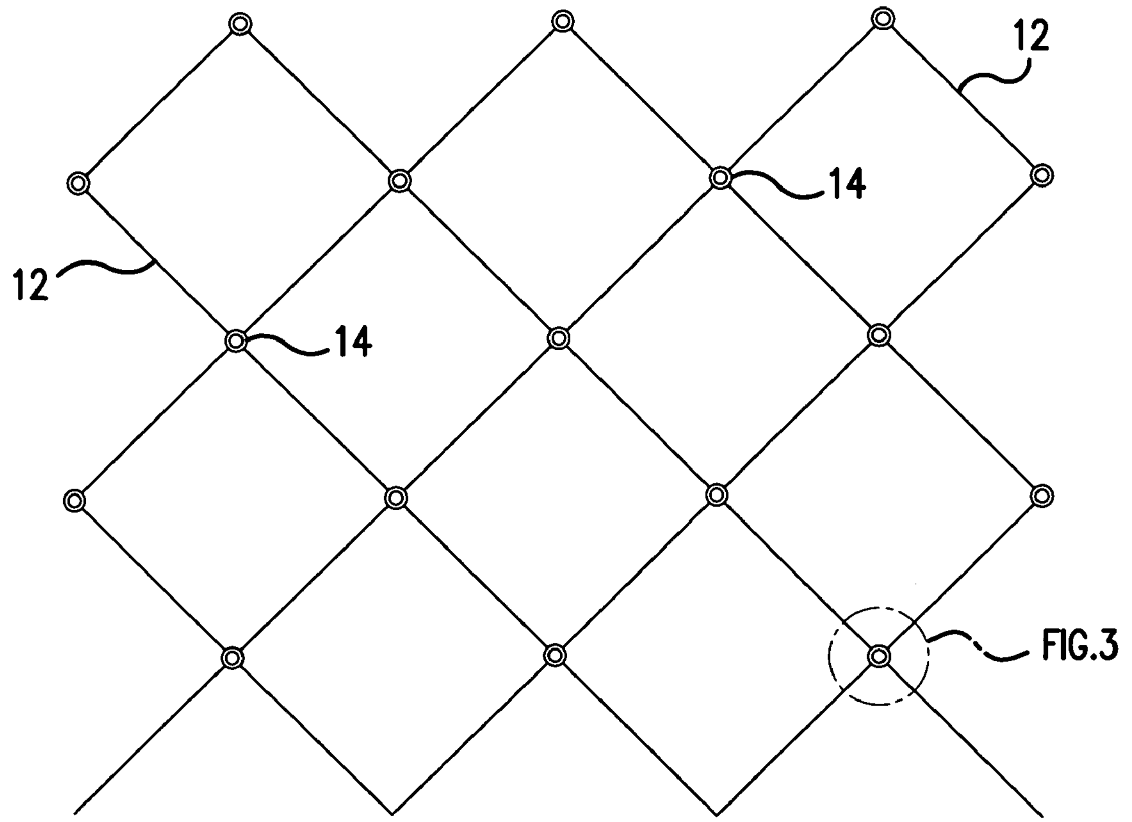
FIG.2 BACKGROUND ART
FIG. 2 is a close-up view of a weave pattern of the fiber optic cable of FIG. 1.
Figure 3:
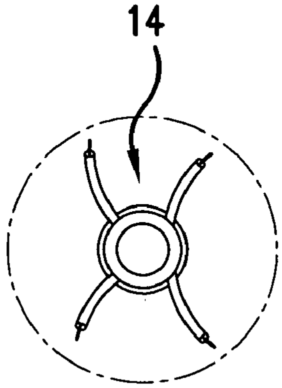
FIG.3 BACKGROUND ART
FIG. 3 is a close-up view of a clip holding the fiber optic cable of FIG. 2 into its weave pattern.
Figure 4:
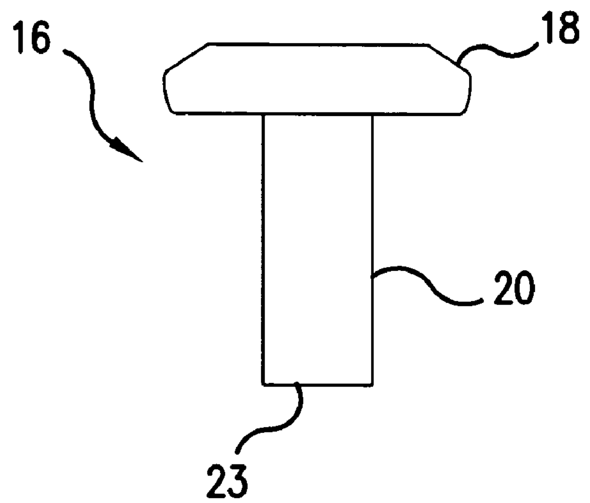
FIG.4 BACKGROUND ART
FIG. 4 is a side view of a first part of the clip of FIG. 3.
Figure 5:
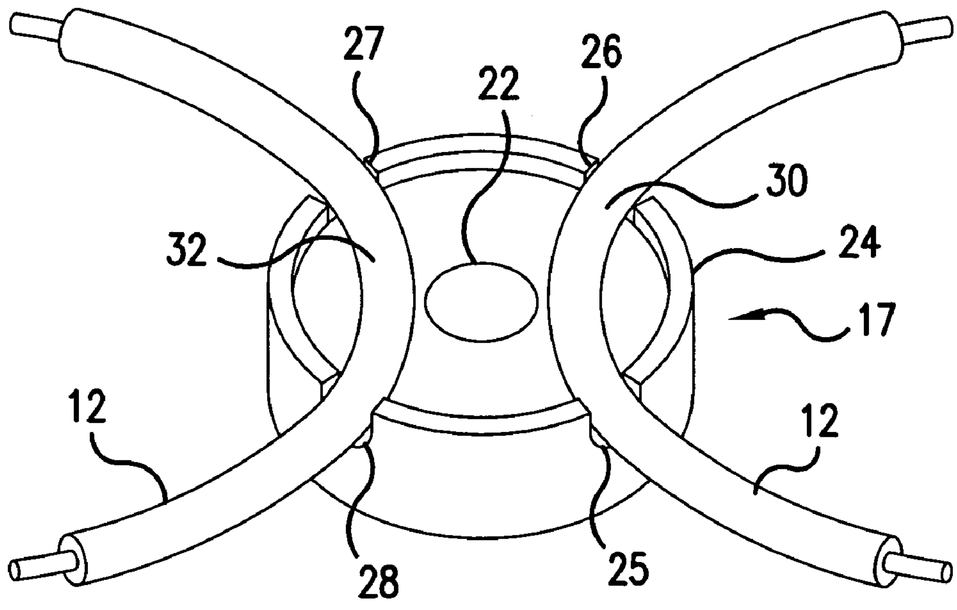
FIG.5 BACKGROUND ART
FIG. 5 is a perspective view of a second part of the clip of FIG. 3.
Figure 6:
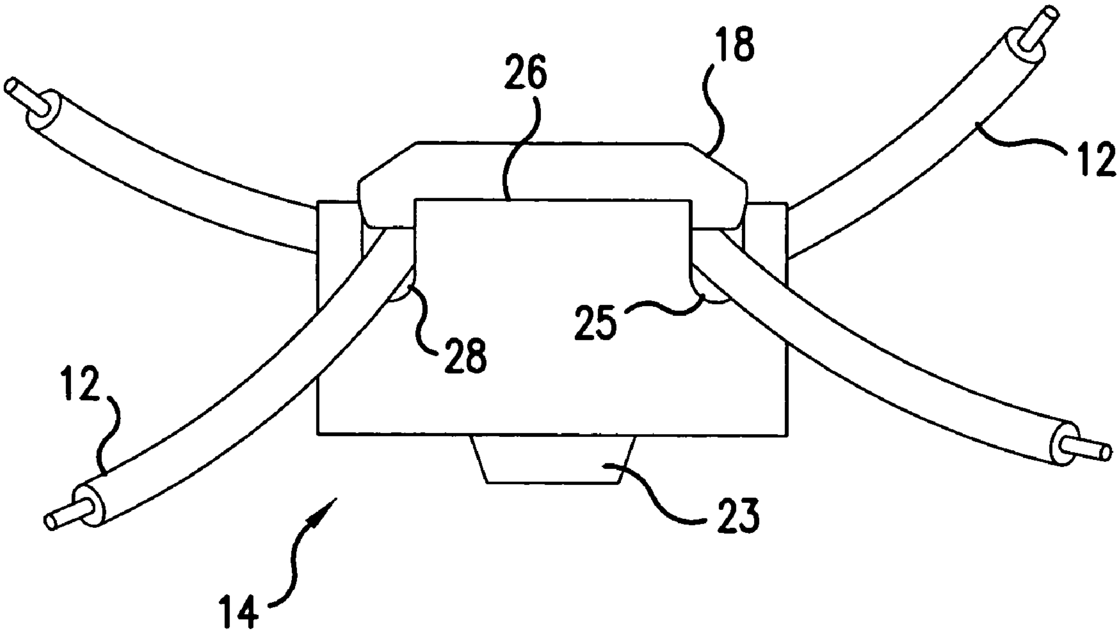
FIG.6 BACKGROUND ART
FIG. 6 is a side view of the first and second parts of FIGS. 4 and 5 in an assembled state.
Figure 7:
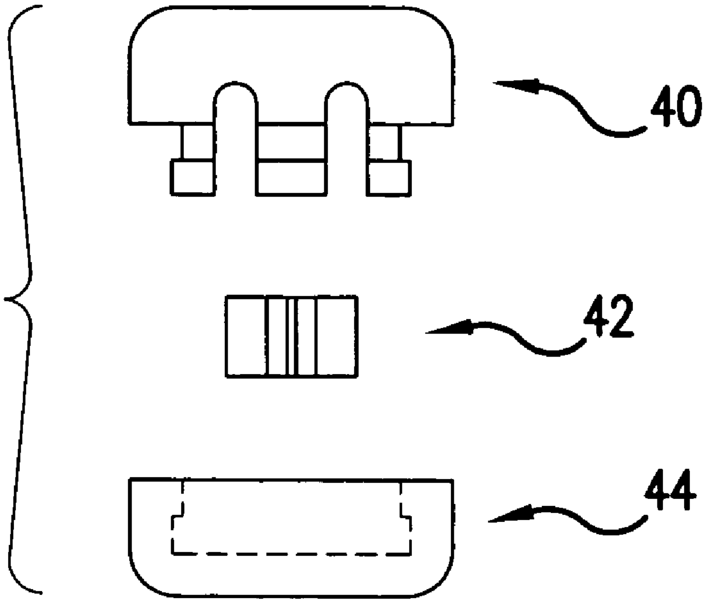
FIG. 7 is a side exploded view of a clip, in accordance with the present invention.
Figure 9:
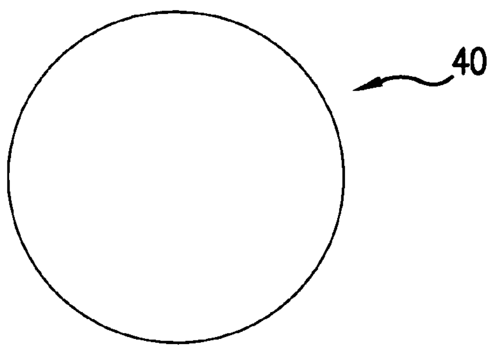
FIG. 9 is a top view of a first part of the clip of FIG. 7.

Referring to FIG. 7, a clip, in accordance with the present invention, generally includes a first part 40, an insert 42 and a second part 44. With reference to FIGS. 7–12, the first part 40 has the appearance of a circular disc when viewed from its top (FIG. 9).

A bottom of the first part 40 (FIGS. 8 and 10) is more complex in shape. A first curved channel 46 and a second curved channel 48 form geometric cords to the outer perimeter of the first part 40. The first and second curved channels 46 and 48 meet in a central space 50 formed in the bottom of the first part 40. Hence, the first and second curved channels 46 and 48 form an embedded X-shape in the bottom of the first part 40.

The first part 40 includes a first stepped ledge 52. The first stepped ledge 52 extends radially inward from an outermost periphery of the bottom of the first part 40.

Engagement walls 54 extend down from the first stepped ledge 52. As illustrated in FIGS. 7, 8, 11 and 12, the engagement walls 54 form approximately a ninety-degree angle with the first stepped ledge 52.

Figure 10:
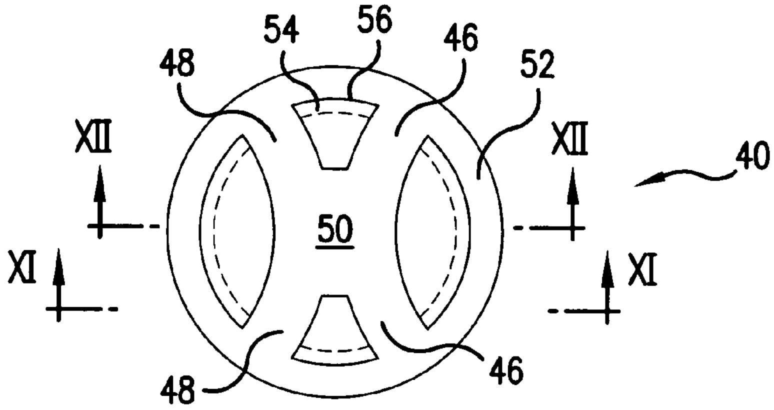
FIG. 10 is a bottom view of the first part of FIG. 7.
Figure 11:
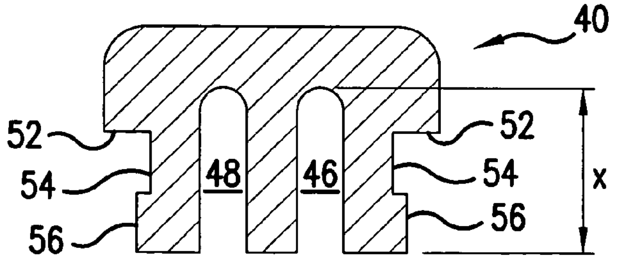
FIG. 11 is a cross sectional view taken along line XI—XI in FIG. 10.
Figure 12:
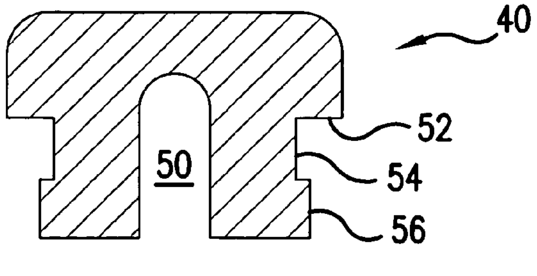
FIG. 12 is a cross sectional view taken along line XII—XII in FIG. 10.

At the end of the engagement walls 54, opposite the first stepped ledge 52, there are protrusions 56. The protrusions 56 extend radially outward and are illustrated as forming an angle of approximately ninety degrees with the engagement walls 54. As best illustrated in FIG. 10, the shape of the engagement walls 54 is approximately circular in a bottom view. Further, the shape of the protrusions 56 is approximately circular in a bottom view.

In a preferred embodiment, the first part 40 is formed of metal. Although it is also possible that the first part 40 could be formed of other materials such as a hardened ceramic or plastic material. Also, the engagement walls 54 and protrusions 56 have been illustrated at certain angles (e.g. ninety degrees) and as having certain outer profiles (e.g. circular), it should be appreciated that other physical configurations would be possible and would come within the spirit and scope of the appended claims.

Figure 13:
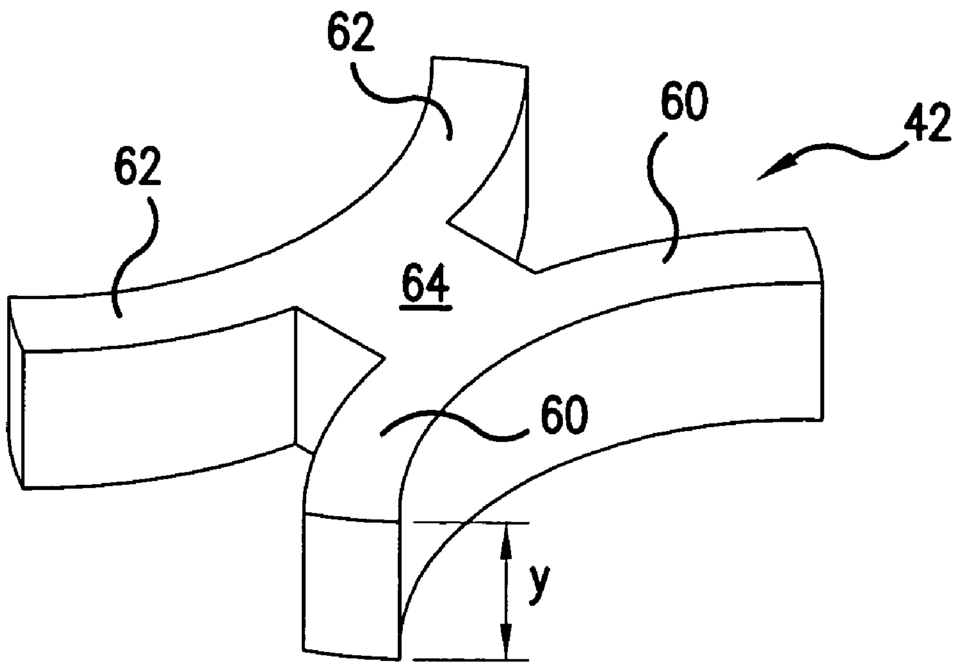
FIG. 13 is a perspective view of an insert member of the clip in FIG. 7.
Figure 14:
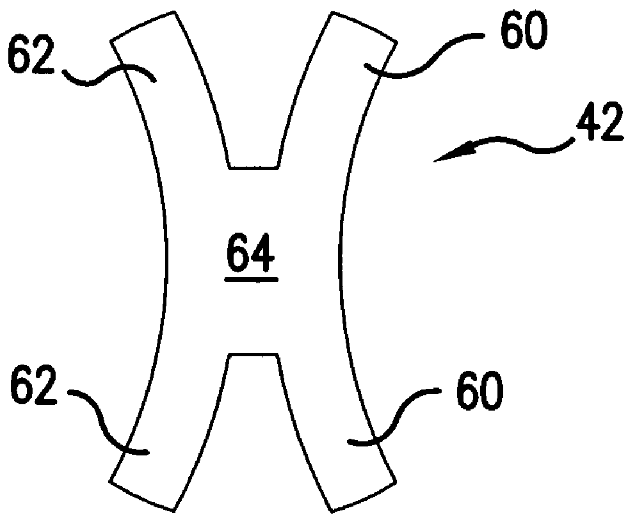
FIG. 14 is a top view of the insert member of FIG. 13.

FIGS. 7, 13 and 14 depict the insert 42. In a preferred embodiment, the insert 42 is a unitary or one-piece structure. The insert 42 has a first leg 60 and a second leg 62. The first leg 60 is joined to the second leg 62 at a hip 64.

The first leg 60 is sized to fit closely between the walls defining the first channel 46. The second leg 62 is sized to fit closely between the walls defining the second channel 48. The hip 64 is sized to fit closely between the walls defining the central space 50.

The insert 42 has a height y, as illustrated in FIG. 13. The height y is less than a height x of the first and second channels 46 and 48, illustrated in FIG. 11. For example, the height y of the insert 42 could be approximately 6 mm, whereas the height x of each of the first and second channels 46 and 48 could be approximately 8.5 mm. The insert 42 may be formed of a plastic material, a ceramic material or a metal.

Figure 15:
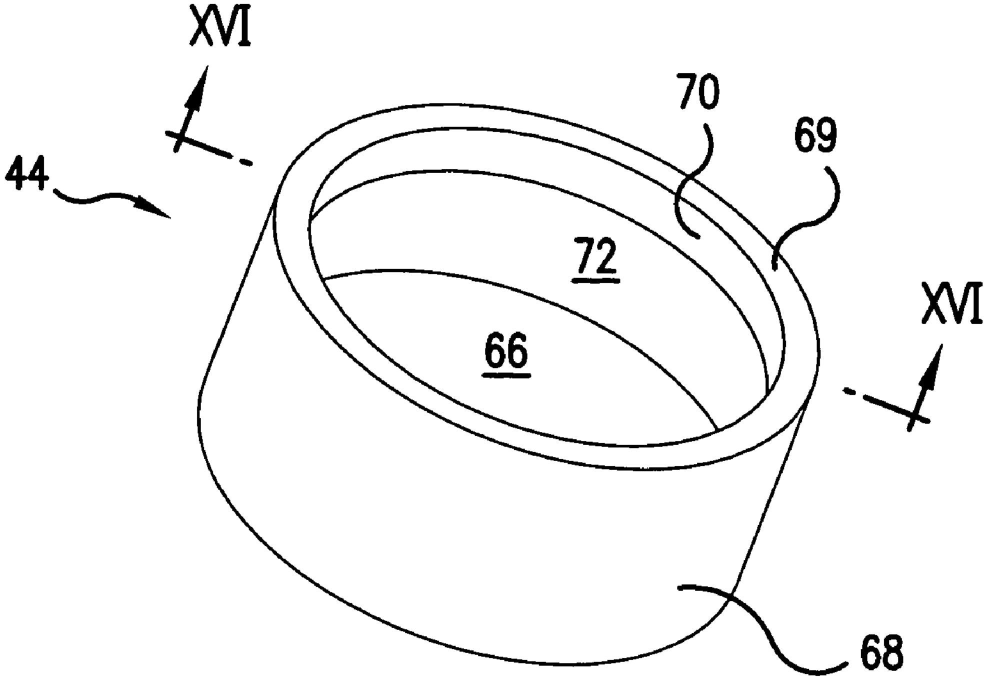
FIG. 15 is a perspective view of a second part of the clip of FIG. 7.
Figure 16:
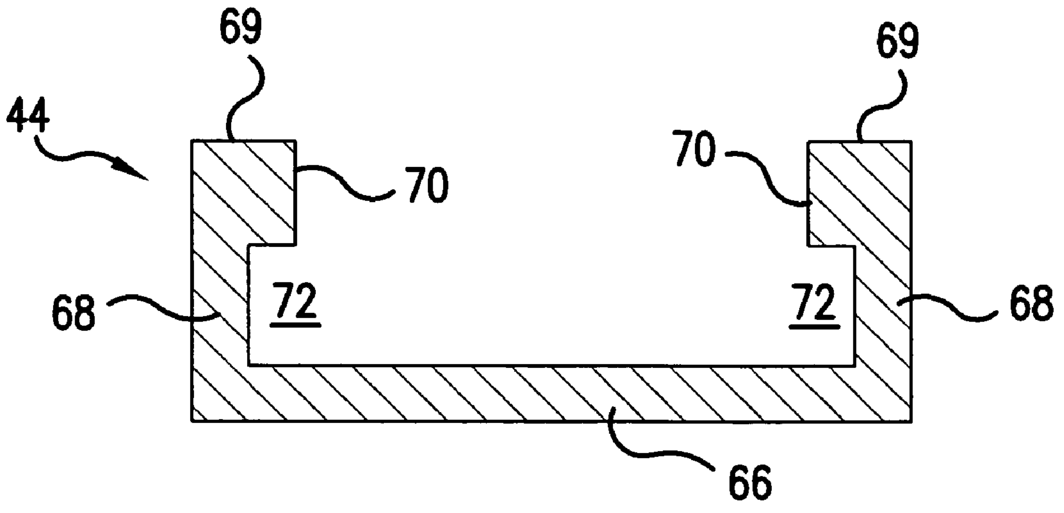
FIG. 16 is a cross sectional view taken along line XVI—XVI in FIG. 15.

FIGS. 7, 15 and 16 depict the second part 44. The second part 44 has the appearance of a circular disc when viewed directly at the bottom surface 66 of the second part 44. An outermost perimeter wall 68 extends upwardly from the bottom surface 66. The outermost perimeter wall 68 extends up to second stepped ledge 69. A lip 70 extends radially inward from the second stepped ledge 69. Hence, a recess 72 is formed beneath the lip 70.

In a preferred embodiment, the second part 44 is formed of metal. Although it is also possible that the second part 44 could be formed of other materials such as a hardened ceramic or plastic material. Also, the outermost perimeter wall 68 and lip 70 have been illustrated at certain angles (e.g. ninety degrees) and as having certain outer profiles (e.g. circular), it should be appreciated that other physical configurations would be possible and would come within the spirit and scope of the appended claims.

Figure 17:
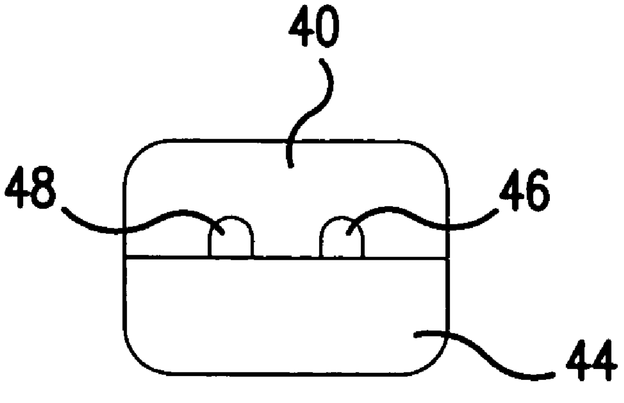
FIG. 17 is a side view of the assembled first part, insert, and second part, with the sections of fiber optic cable removed for clarity.
Figure 8:
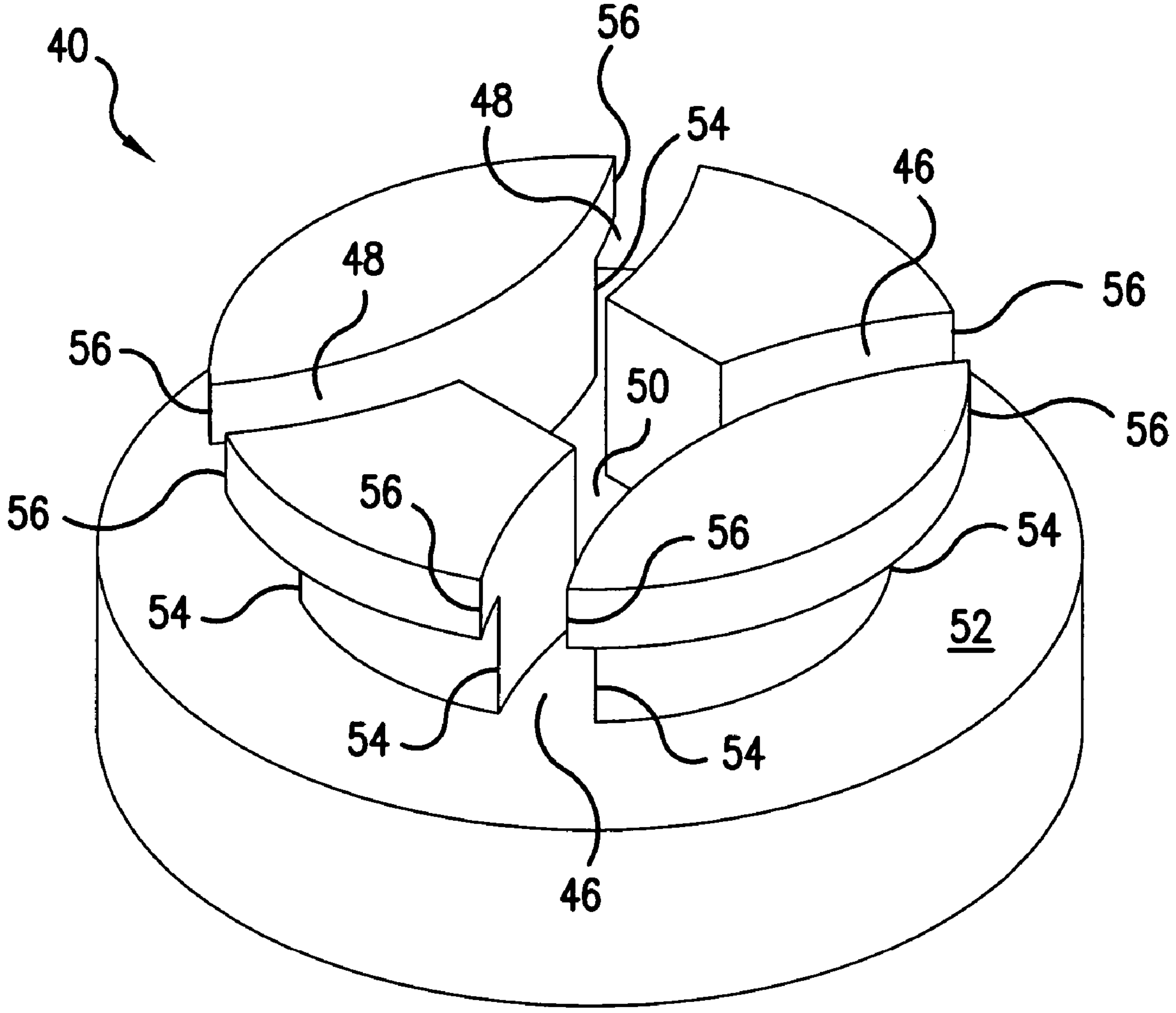
FIG. 8 is a perspective view of a bottom of the first part of the clip of FIG. 7.

Now, with reference to FIGS. 7 and 17, a method of assembling the first part 40, the insert 42 and the second part 44 in combination with a fiber optic cable 12 will be described. A person holds the first part 40 having the first channel 46 and the second channel 48. The person inserts a first section 30 of the fiber optic cable 12 into the first channel 46. Next, the person inserts a second section 32 of the fiber optic cable 12 into the second channel 48.

The person places the insert 42 into the first and second channels 46 and 48 to abut the first and second sections 30 and 32 of the fiber optic cable 12. Preferably, glue is applied to the first and second sections 30 and 32 of the fiber optic cable 12 and/or the insert 42 and/or the first and second channels 46 and 48. The glue can be specifically formulated to partially melt and bond with an outer sleeve or jacket of the fiber optic cable 12. Also, the glue could partially melt and bond with the insert 42, if the insert 42 is formed of a plastic material.

Next, the person takes the second part 44. The bottom surface 66 of the second part 44 is abutted against the insert 42, and pressure is applied to draw the first part 40 and the second part 44 closer together. The pressure can be applied by hand or by using a tool, such as pliers. As the person presses the first and second parts 40 and 44 together, the insert 42 compresses the first and second sections 30 and 32 of the fiber optic cable 12 against a bottom of the first and second channels 46 and 48. Eventually, first structural features of the first part 40, e.g. the engagement walls 54 and protrusions 56, will engage and lock into second complimentary structural features of the second part 44, e.g. the lip 70 and recess 72, and the first stepped ledge 52 will then abut the second stepped ledge 69, as illustrated in FIG. 17.

Typically, the diameter of a fiber optic cable 12 used to form the weave pattern is approximately 3 mm. Since the height y of the insert 42 is approximately 6 mm and the depth x of the first and second channels 46 and 48 is approximately 8.5 mm, the diameter of the fiber optic cable 12 will be compressed. In a preferred embodiment, the dimensions x and y are set such that the diameter of the fiber optic cable 12 is compressed approximately 15 to 20%. This compression locks the first and second sections 30 and 32 of the fiber optic cable 12 tightly into the clip, and also ensures a tight bonding with the glue applied during the assembly process. Although specific dimensions x and y have been used to explain the invention, it should be appreciated that other dimensions for the dimensions x and y could be employed, such as if a smaller or a larger diameter fiber optic cable 12 were employed in combination with the present invention.

Although a protrusion 56 of the first part 40 engaging within a recess 72 of the second part 44 has been illustrated as the interlocking first and second structural features, it should be appreciated that other types of interlocking structural features would be possible. Moreover, it would be possible to reverse the location of the interlocking structural features, such that the protrusions 56 are provided on the second part 44 and the recess 72 is provided on the first part 40.

A goal of the present invention is to make a clip, which is very difficult to break and/or remove from the first and second sections 30 and 32 of the fiber optic cable 12. The more difficult it is to remove the clip, the more likely that a potential intruder will stress or break the fiber optic cable 12 and raise an alarm. Further, the more difficult it is to remove the clip, the more time it will take a potential intruder to remove the clip, and hence the more likely the intruder will be caught.

In a preferred embodiment of the present invention, the first and second parts 40 and 44 are formed of a metal, having an increased hardness and tensile strength. If such metals are employed in the construction of the first and second parts 40 and 44, the clip will be very difficult to break off of the first and second sections 30 and 32 of the fiber optic cable 12, even if using a pressure generating tool (e.g. pliers) or a cutting tool (bolt cutters).

Further, if metal is used to construct the first and second parts 40 and 44, the metal will conduct heat to the fiber optic cable 12 due to the metal's high thermal conductivity. Therefore, if a potential intruder attempts to remove the clip using a flame source or an electronic cutting tool, the metal will conduct the high heat and cause a break or bend in the fiber optic cable to signal a breach attempt.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method of attaching fiber optic cable to itself and to a security fence for security monitoring comprising the steps of:

forming a weave pattern in a fiber optic cable;

fixing a first section of the fiber optic cable to a second section of the fiber optic cable using a clip having a first part with first and second channels by:

inserting the first section of fiber optic cable into the first channel;

inserting the second section of fiber optic cable into the second channel;

placing an insert into at least one of the first and second channels to abut at least one of the first and second sections of fiber optic cable;

engaging first structural features of the first part to complimentary second structural features of a second part of the clip; and locking the first and second parts together to sandwich the sections of fiber optic cable between the first part and the insert; and attaching the fiber optic cable to the security fence.

2. The method according to claim 1, further comprising the step of applying a glue on the sections of fiber optic cable in the first and second channels.

3. The method according to claim 2, wherein said step of placing an insert into at least one of the first and second channels to abut at least one of the first and second sections of fiber optic cable includes:

placing a unitary, one-piece insert into both of the first and second channels to abut both of the first and second sections of fiber optic cable.

4. A combination comprising:

a security fence; and a fiber optic cable formed into a pattern by clips, and attached to said security fence, wherein each clip holds at least two sections of fiber optic cable to form said pattern, each said clip including:

a first part having a first channel for holding a first section of fiber optic cable and a second channel for holding a second section of fiber optic cable, said first part including first structural features;

an insert which fits into at least one of said first and second channels; and a second part including complimentary second structural features, wherein said second part holds said insert into at least one of said first and second channels when said second structural features of said second part engage with said first structural features of said first part.

5. The combination according to claim 4, wherein said first and second channels are curved.

6. The combination according to claim 4, further comprising:

glue located in at least one said first and second channels.

7. The combination according to claim 6, wherein said glue is located in both of said first and second channels.

8. The combination according to claim 4, wherein said insert is a unitary, one-piece structure which fits into both of said first and second channels.

9. The combination according to claim 8, wherein said insert is approximately X-shaped.

10. The combination according to claim 8, wherein said insert is formed of plastic.

11. The combination according to claim 8, wherein said insert is formed of metal.

12. The combination according to claim 4, wherein said first part and said second part are formed of metal.

13. The combination according to claim 4, wherein said first structural feature includes a protrusion and said second structural feature includes a recess.

14. The combination according to claim 13, wherein said recess runs completely around an inner circumferential surface of said second part.

15. The combination according to claim 4, wherein said second part presses said insert toward said first part for sandwiching sections of fiber optic cable between said insert and said first part, when said second structural features of said second part mate with said first structural features of said first part.

16. The combination according to claim 15, wherein glue is located in both of said first and second channels.

17. The combination according to claim 16, wherein said insert is a unitary, one-piece structure which fits into both of said first and second channels.

18. The combination according to claim 17, wherein said insert is approximately X-shaped.

19. The combination according to claim 18, wherein said first structural feature includes a protrusion and said second structural feature includes a recess.

20. The combination according to claim 19, wherein said recess runs completely around an inner circumferential surface of said second part.

21. The combination according to claim 4, wherein engagement of said first and second structural features results in said first section of fiber optic cable being compressed between said insert and said first channel.

22. The combination according to claim 21, wherein engagement of said first and second structural features results in said second section of fiber optic cable being compressed between said insert and said second channel.

* * * * *